(12) United States Patent
McIntosh et al.

(10) Patent No.: US 10,831,884 B1
(45) Date of Patent: Nov. 10, 2020

(54) NESTED FUNCTION POINTER CALLS

(71) Applicant: INTERNATIONAL BUSINESS MACHINES CORPORATION, Armonk, NY (US)

(72) Inventors: Ronald Ian McIntosh, Ontario (CA); Roland Froese, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/571,258

(22) Filed: Sep. 16, 2019

(51) Int. Cl.
| | |
|---|---|
| *G06F 21/52* | (2013.01) |
| *G06F 9/38* | (2018.01) |
| *G06F 9/448* | (2018.01) |
| *G06F 9/30* | (2018.01) |

(52) U.S. Cl.
CPC .......... *G06F 21/52* (2013.01); *G06F 9/30043* (2013.01); *G06F 9/30134* (2013.01); *G06F 9/30141* (2013.01); *G06F 9/3806* (2013.01); *G06F 9/4486* (2018.02)

(58) Field of Classification Search
CPC ....... G06F 9/3806; G06F 9/4486; G06F 21/52
See application file for complete search history.

(56) References Cited

U.S. PATENT DOCUMENTS

| | | | | |
|---|---|---|---|---|
| 7,143,394 B1 * | 11/2006 | Shadmon | ............ | G06F 11/3612 717/130 |
| 7,415,699 B2 * | 8/2008 | Gouriou | ................ | G06F 9/4843 717/124 |
| 7,818,514 B2 * | 10/2010 | Blumrich | ............ | G06F 12/0862 711/137 |
| 8,291,381 B2 * | 10/2012 | Lai | ........................ | G06F 9/4484 717/124 |
| 8,370,821 B2 * | 2/2013 | Haber | .................... | G06F 8/4441 717/151 |
| 9,411,590 B2 * | 8/2016 | Smith | .................... | G06F 9/3806 |
| 9,430,236 B2 | 8/2016 | Gschwind | | |
| 2004/0168078 A1 | 8/2004 | Brodley | | |
| 2014/0344789 A1 * | 11/2014 | Bates | .................... | G06F 11/362 717/129 |

(Continued)

OTHER PUBLICATIONS

Pizka et al., "Evolving Software Tools for New Distributed Computing Environments" published in PDPTA 1997, https://www.semanticscholar.org/paper/Evolving-Software-Tools-for-N . . . , pp. 1-12.

*Primary Examiner* — Chat C Do
*Assistant Examiner* — Douglas M Slachta
(74) *Attorney, Agent, or Firm* — Richard A. Wilhelm

(57) ABSTRACT

Calling a function may include: determining whether a call is a direct or an indirect call. In response to determining that the call is an indirect call, a first address stored in a function pointer may be obtained, wherein the function pointer is stored at a first address in a stack frame of a calling function. Whether to execute a nested function call code sequence may be determined based on whether a tag bit in the first address stored in the function pointer is set. In response to determining that the tag bit in the first address is set, a second address stored at a nested function address location may be obtained, wherein the nested function address location is at the first address, and control may be transferred to a called function, wherein the called function is stored at the second address.

20 Claims, 15 Drawing Sheets

(56) References Cited

U.S. PATENT DOCUMENTS

| | | | |
|---|---|---|---|
| 2015/0058605 A1* | 2/2015 | Madampath | G06F 11/34 712/234 |
| 2015/0058825 A1* | 2/2015 | Madampath | G06F 11/34 717/128 |
| 2016/0124850 A1* | 5/2016 | Gschwind | G06F 8/54 711/155 |
| 2019/0087566 A1* | 3/2019 | Hosie | G06F 21/42 |
| 2019/0303161 A1* | 10/2019 | Nassi | G06F 9/3844 |

* cited by examiner

And_Immediate. condition_register_0 = register_containing_function_pointer, 1
// Extract tag bit (0 or 1) to Condition Register #0

Move_To_Count_Register register_containing_function_pointer
// Prepare to branch, speculating that the tag bit is 0, by moving pointer to Count Register Branch_To_Count_Register if_condition_register_Eq_0 condition_register_0, count_register
// If Condition Register #0 is zero (meaning the tag bit is 0, meaning this is a normal call), then branch to the address in the Count Register (from function pointer)
// Else, continue Subtract_Immediate register_containing_function_pointer = register_containing_function_pointer, 1
// Remove tag bit from function pointer by subtracting 1

Load register_containing_function_address = register_containing_function_pointer, 0
// Copy the nested function address from memory to the register_containing_function_address Subtract register_to_contain_environment_pointer =
register_containing_function_pointer,
known_distance_of_nested_function_address_from_stack_pointer
// Calculate environment_address = function_pointer (with tag bit removed) - known distance of nested_function_address from stack_pointer Move_To_Count_Register register_containing_function_address
// Prepare to branch by moving function pointer (with tag bit removed) to Count Register Branch_To_Count_Register count_register
// Branch to the address in the Count Register (from function pointer with tag removed)

FIG. 6

And_Immediate. condition_register_0 = register_containing_function_pointer, 1
// condition_register_0 = register_containing_function_pointer & 1;
// ("&" does a bitwise and between its left and right operands.)

Move_To_Count_Register register_containing_function_pointer
// count_register = register_containing_function_pointer;

Branch_To_Count_Register_if_condition_register_Eq_0 condition_register_0, count_register
// if (condition_register_0 == 0) goto count_register;

Subtract_Immediate register_containing_function_pointer = register_containing_function_pointer, 1
// register_containing_function_pointer = register_containing_function_pointer - 1;

Load register_containing_function_address = register_containing_function_pointer, 0
// Copy the nested function address from memory to the register_containing_function_address
// register_containing_function_address = *register_containing_function_pointer;
// ("*" loads from memory into a register the value in the address its right operand points at.)

Subtract register_to_contain_environment_pointer =
register_containing_function_pointer,
known_distance_of_nested_function_address_from_stack_pointer
// environment_address = function_pointer_register − (nested_function_address - stack_pointer);

Move_To_Count_Register register_containing_function_address
// count_register = function_pointer_register;

Branch_To_Count_Register count_register
// goto count_register;

FIG. 7

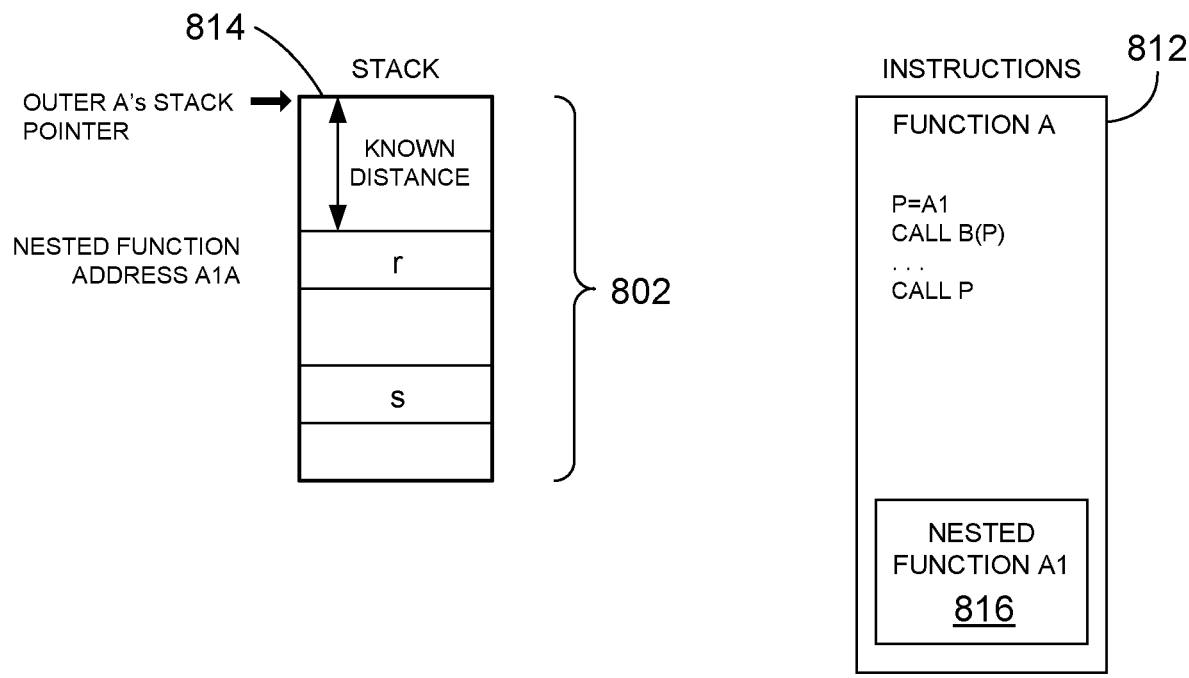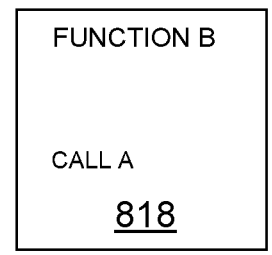
FIG. 8A

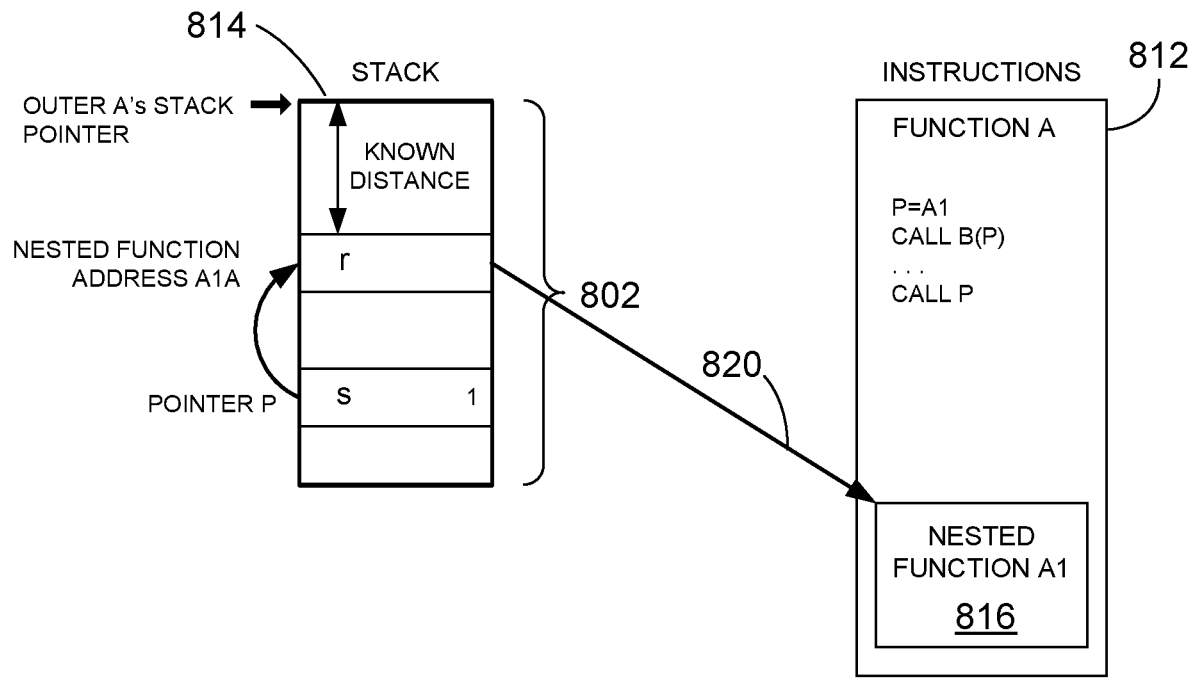
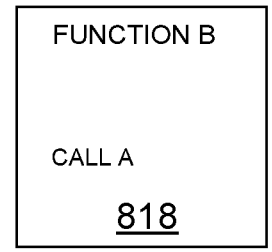
FIG. 8B

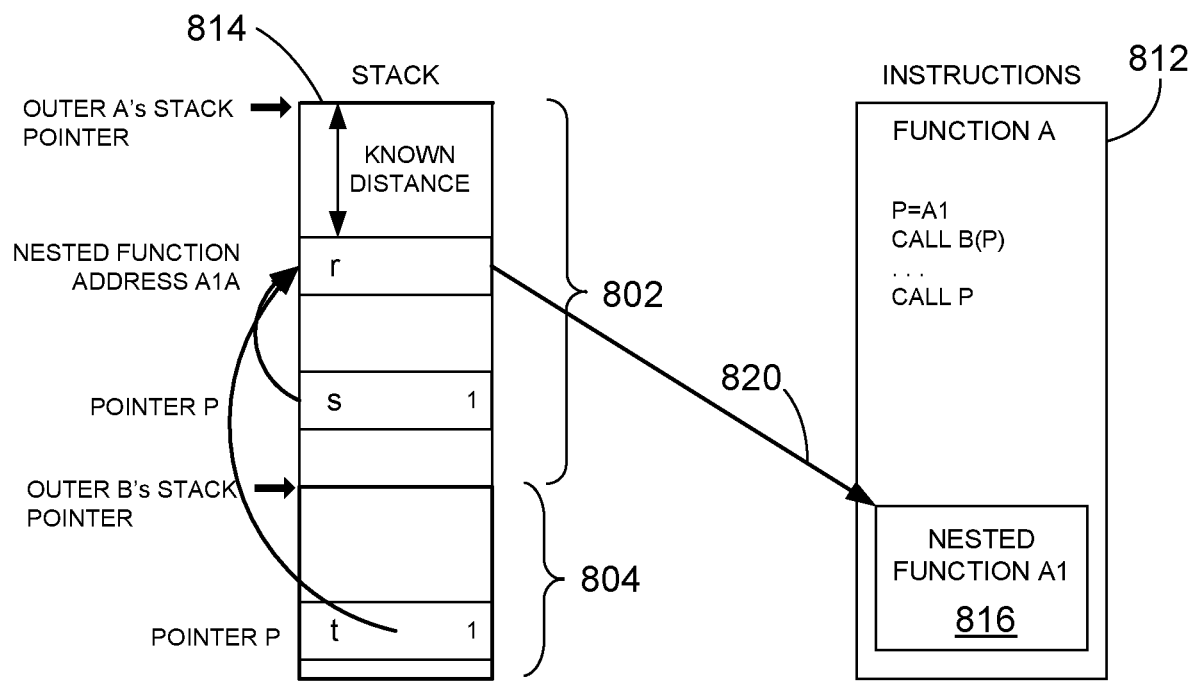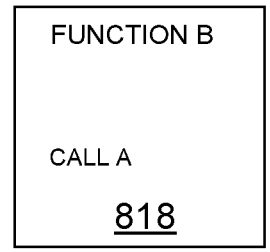
FIG. 8C

NESTED FUNCTION POINTER CALLS

BACKGROUND

The present disclosure relates to function calls in computer programs, and more specifically, to indirect function calls to nested functions.

Source code for computer programs normally includes many functions (also called methods or subroutines). Each function typically performs a specific task. A main section of code (or a main function) typically includes function calls to various functions used by the program. The caller of a function may be referred to as a "caller" and the called function referred to as a "called function." A function, when called, may call other functions, as needed, in the course of performing a task.

When a caller of a function calls the function, it may call the function "directly," e.g., using the memory address where the function is stored. Alternatively, a caller of a function may call the function using a "function pointer." A function pointer may be created by any other function for which the called function is visible, whether it is visible by being externally defined, or by being a nested child. When a caller uses a function pointer to call a function, the call is referred to as a "pointer call" or an "indirect call." A function pointer is a variable stored in memory that holds a value, which is the memory address of a function. To obtain the memory address of the function, a dereferencing operation is performed on the function pointer. Any function with access to the function pointer can call whatever function the function pointer points at.

When a child function finishes performing its task, it typically "returns control" to the parent function that called it. Returning control means that the next program instruction to be executed by the processor after the last instruction of the child function is an instruction in the parent function. The return of control to the parent function is accomplished by specifying the address of an instruction in the parent function. This address is known as the "return address." Normally, the return address may be the next instruction in the parent function following the call instruction that invoked the child function, although in many programming languages the caller may specify an alternate return address, for example, for error handling.

In addition to calling other functions, a function can also call itself. This is referred to as a recursive function call. A recursive call is one in which a function calls a new instance of itself (direct recursion) or calls some other function which, in turn, calls the original function (indirect recursion).

A "nested function" is a function defined within the body of another (enclosing or parent) function. Many programming languages support nested functions. For example, some versions of the following languages support nested functions: ALGOL-based languages, Ada, Pascal, Lisp, ECMAScript, Scala, Python, PHP, GCC, C, C#, D, MATLAB, PL/I-based languages and Fortran. In those languages, the containing function may be referred to as the "parent" and the contained function(s) the "child" or "children" or "nested functions." That "nesting" may be extended to multiple levels, leading to "grandparents" and "grandchildren," etc., or more generally "ancestors" and "descendants." Generally, a nested function is visible to its parent and "siblings" and its descendants, but not directly to anything further above it than its immediate parent. Some languages allow functions to be nested within others but the nested functions are not allowed to access their parent's local variables so do not need access to the parent's "environment" (e.g., the C++, Lua and Perl languages).

SUMMARY

According to various embodiments, a computer-implemented method for calling a function includes: determining whether a call is a direct or an indirect call. In response to determining that the call is an indirect call, the method includes obtaining a first address stored in a function pointer, wherein the function pointer is stored at a first address 208 in a stack frame of a calling function. The method includes determining whether to execute a nested function call code sequence based on whether a tag bit in the first address stored in the function pointer is set. In addition, the method includes, in response to determining that the tag bit in the first address is set, obtaining a second address stored at a nested function address location 210, wherein the nested function address location is at the first address, and transferring control to a called function, wherein the called function is stored at the second address.

In various embodiments, the obtaining a second address stored at a nested function address location 210, may include cancelling the tag bit in the first address stored in the function pointer.

In various embodiments, the method may include accessing, by the called function, an environment variable of the calling function.

In various embodiments, the method may include accessing, by the called function, an environment variable of a first calling function, wherein: the called function is called by a second calling function, the second calling function being a calling function other than the first calling function.

In various embodiments, in response to determining that the tag bit in the first address stored in the function pointer is not set, the method may include: transferring control to a called function, wherein the called function is stored at the first address 208.

In various embodiments, in response to determining that the call is a direct call, the method may include: passing to a called function: the address of a pointer for a nested function having an address is stored in a function pointer, wherein the nested function is nested in the calling function.

In various embodiments, the address stored in the function pointer may either include a tag bit or not include a tag bit.

In various embodiments, in response to determining that the call is a direct call, the method may include: passing to a called function: the address of an environmental variable of a calling function.

In various embodiments, the called function may include an entry point for direct calls and an entry point for indirect calls.

In addition, various embodiments are directed to a computer system and a computer program product for calling a function may include operations or program instructions corresponding to the computer-implemented method described herein.

The above summary is not intended to describe each illustrated embodiment or every implementation of the present disclosure.

BRIEF DESCRIPTION OF THE DRAWINGS

FIG. 6 illustrates one example of source code for a call to a nested function suitable for use with an IBM Power computer system.

FIG. 7 illustrates one example of source code for a call to a nested function in the C computer language.

FIGS. 8A-H illustrates an example in which multiple instances of a parent and another function are generated and an instance of the other function is able to access the appropriate environment variables according to various embodiments.

Figure 1:
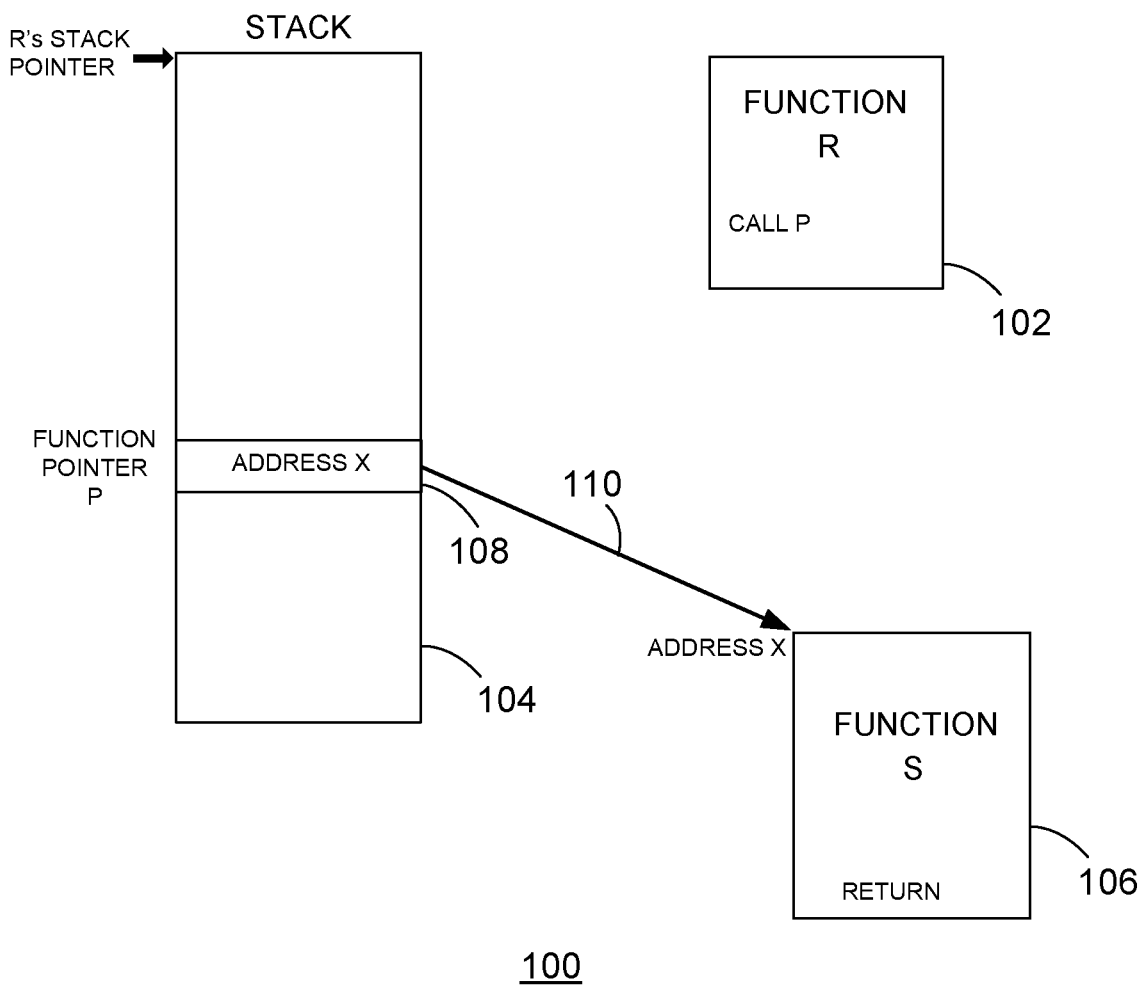
FIG. 1 illustrates an indirect call to a called function by a caller function and its stack frame according to various embodiments.

The same numbers may be used in the Figures and the Detailed Description to refer to the same devices, parts, components, steps, operations, and the like. While the concepts and embodiments described in this disclosure are amenable to various modifications and alternative forms, specifics thereof have been shown by way of example in the drawings and will be described in detail. It should be understood, however, that the intention is not to limit the claims to the particular embodiments described. On the contrary, the intention is to cover all modifications, equivalents, and alternatives falling within the spirit and scope of the invention.

DETAILED DESCRIPTION

The combination of nested functions, potential recursion, and pointer calls is complicated to implement. When a parent function stores the address of a child function in a pointer, any call to what the pointer points at must use the local variables of that instance of the parent, not some other instance of the parent function. Consider a scenario in which function x calls itself and that second instance of x stores the address of a nested function y in pointer p. The second instance of x then calls itself again passing p as a parameter. The third instance of x then calls function z passing parameter p. Finally, z calls whatever p points at, which is function y. The environment pointer that function y uses must point at the local variables of the second instance of x, because that instance of x stored the address in p. Various embodiments of the present invention provide for an environment pointer for the function y that points at the local variables of the second instance of x in the foregoing scenario. Various embodiments employ a pointer mechanism that provides can provide two pieces of information: the first being the address of the function to call, and the second being the address of the environment variables for a particular instance of a parent function that stored the address of the function to call.

In some implementations, a function pointer must provide a third piece of information: the address of a table of pointers to other functions and data (sometimes known as a Table of Contents (TOC) or a Global Offset Table (GOT) or a Binding Section). Various embodiments of the present invention are capable of providing this third piece of information. If the application binary interface (ABI) specifies that the callee TOC or GOT is established on the callee side, then embodiments of the present invention will work without modification. On the other hand, if the callee TOC or GOT must be established before entering the callee, then the parent must include code to save the TOC in its local stack. This may be at an architected offset or adjacent to the nested function address. In either case, once the parent stack frame address has been calculated in the callee, the TOC may be retrieved. The nested function TOC will be the same as parent TOC.

According to various embodiments, when a nested function has its address stored into a function pointer in a parent function (this function pointer may be referred to as a first pointer), a second pointer to the nested function is automatically created by the compiler (may be referred to as a second pointer or a "nested function address"). At the time the nested function has its address stored into the function pointer (first pointer), the nested function address (or second pointer) is initialized to point to the nested function. The address of the second pointer, not the address of the nested function is stored in the function pointer (first pointer). A "tag" bit is also set in the function pointer (first pointer) to indicate that this is a nested function pointer.

Later, when a call uses the function pointer (first pointer), the tag is checked and, if set, a novel, alternate way of calling is used. The novel way of calling includes calculating the stack frame address of the parent function, which may be used as an environment pointer for the nested function, thereby allowing the nested function means to access to the environmental variables of the parent function. According to various embodiments, the environment pointer for the nested function uses a base register, and the environment variable's address may be determined by adding a known offset. If recursion or other situations have led to multiple instances of the parent and nested function on the stack, a function will have access to the environment information of the parent which created the function pointer that was used to call the nested function.

Most commonly function nesting is only one level deep, with only a parent and children, but it can be multilevel with nested functions nested inside nested functions. In those cases, a nested function can access its parent's variables, its grandparent's variables, and so on. For each nested function, its environment pointer would normally point only at its parent's variables. When its parent was being initialized that would have included saving its environment pointer in its stack frame. To access its grandparent's variables, a function would know where that had been saved and would reload it to use as a base register. This process may be continued through all the nesting levels so any ancestor's variables may be accessed. Where applicable, a compiler optimization would detect cases where only an ancestor's variables are not accessed but a higher level ancestor's are, and pass an ancestor's environment area pointer directly to a child. This mechanism is known in the art and may be used with the present invention.

Generally, an area of memory is allocated for a function when it is called, and that memory is deallocated before control is returned to the caller of the function. A larger area of memory used by a program may be referred to as a run-time stack, a function stack, an execution stack, an invocation stack, or simply a stack. The stack may include multiple entries (also known as frames), one for each active function. The allocation and deallocation within the stack of a stack frame for a particular function is performed by the function when it is entered and as it exits.

Each stack frame stores information about the execution of its respective function. The information may include any, some, or all of identifiers of the function, the return address of the function (the location of the instruction in the caller function to be executed next after the called function returns control to the caller), the values of local variables read or written by the function, parameters passed to the function, an evaluation stack of operands for arithmetic or logical operations, a pointer to the current instance of the function, the enclosing function context, or the privilege or authority level of the function, or both context and privilege.

Many computer systems employ a security mechanism in which particular memory regions are marked as either executable or non-executable. Generally, the area of memory allocated for a stack or a stack frame is readable and writeable, but is not marked as executable. According to various embodiments, a stack or a stack frame may be marked as non-executable.

An environment pointer may point at the part of the caller's stack frame containing its local variables. According to various embodiments, the environment pointer for the nested function is used as a base register and the environment variable's address may be determined by adding or subtracting a known offset, which may be chosen when the function is compiled.

FIG. 1 illustrates an indirect function call. FIG. 1 is a schematic view 100 illustrating a function R (caller) 102, a function S (called function), and a stack frame 104 for the function R 102. In FIG. 1, a stack pointer for the stack frame 104 is shown. The function R includes a call statement. The call statement, call P, is an indirect function call to function S. The function S is stored at memory address X. The call statement uses a function pointer P to obtain the address of called function S. An address for pointer P is stored in the stack frame 104 at memory location 108. When the call statement, call P, is executed, a dereferencing operation is performed in which the address stored for pointer P in the stack frame is obtained. In this example, address X stored at memory location 108 is obtained. The arrow 110 from memory location 108 to function S signifies that the address stored at memory location 108 points to the function S. The address stored for pointer P is an entry point or instruction for function S 106.

Figure 2:
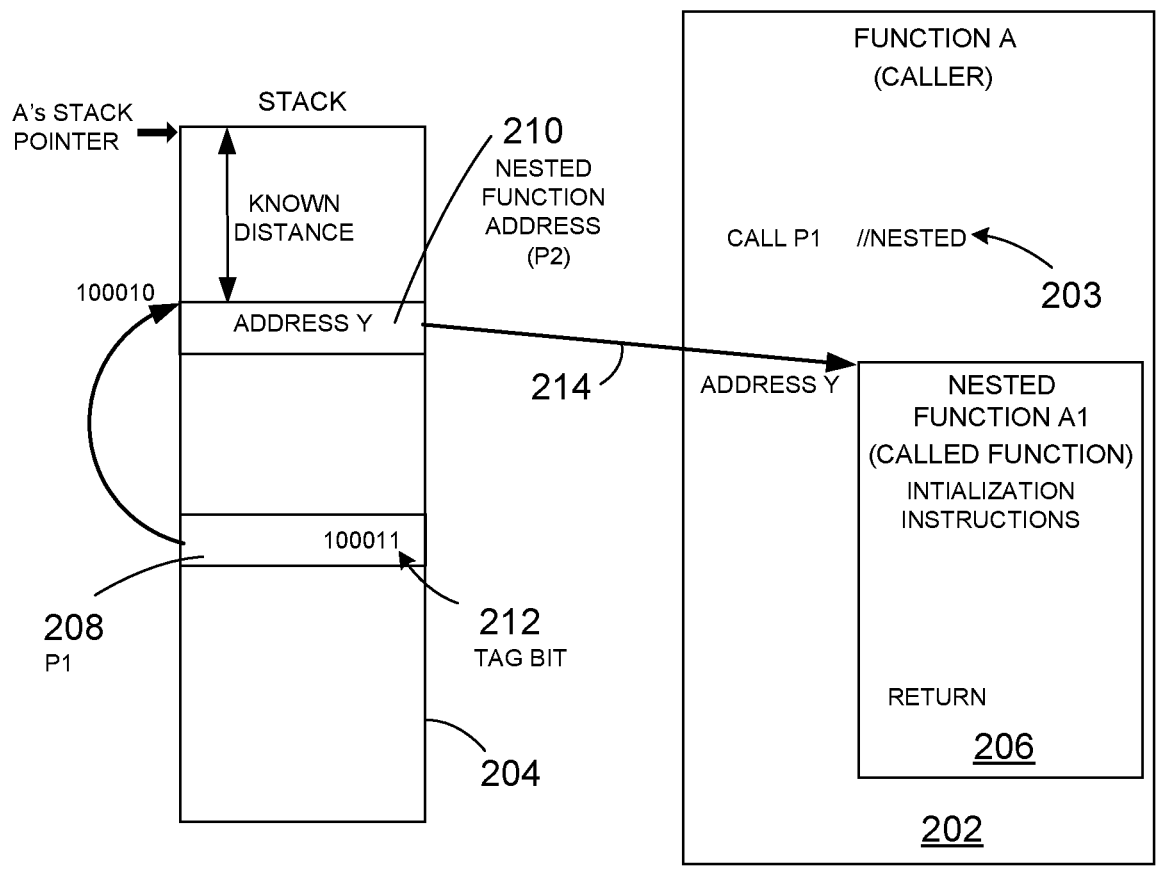
FIG. 2 illustrates an indirect call to a nested called function by a caller function and its stack frame according to various embodiments.

FIG. 2 is a schematic view 200 of a nested function, its parent function, and the stack frame of the parent function according to various embodiments. The parent or caller function 202 is denoted "function A." Parent function 202 includes a call statement 203 and has a stack frame 204. The call statement 203 is in the form of an indirect call to nested function 206. The call statement 203 uses function pointer P1. The nested function 206 is denoted "function A1." Because function A1 is defined within function A, it is a nested function. In various embodiments, the nested function 206 may include initialization instructions that are executed when it is called. The nested function 206 is shown as being stored at a memory address Y. The stack frame 204 may store environment information (not shown) for function A.

According to various embodiments, the stack frame 204 includes a memory location 208 for storing an address of a function pointer P1. The function pointer P1 may be referred to herein as a first pointer. In the example of FIG. 2, the memory location 208 stores memory address 100011. The function pointer P is a tagged pointer. In the example, all of the bits of function pointer P1 contain address information except the LSB (least significant bit), which contains a tag and is denoted as tag bit 212. (Additional details on the use of a tag bit are presented below.) The memory address 100011, associated with the first pointer P1, may be used to determine the address where the address of nested function A1 is stored. In various embodiments, the stack frame 204 includes a memory location 210 for storing an address of the nested function 206, which may be referred to herein as a "nested function address location" (or sometimes as a second pointer P2). The arrow 214 from memory location 210 to nested function A1 206 signifies that the address stored at memory location 210 points to the nested function A1. The nested function address is stored, in this example, at memory address 100010. The address where the nested function (memory address Y) is stored may be determined, in this example, by subtracting 1 from 100011, i.e., 100010.

Figure 3:
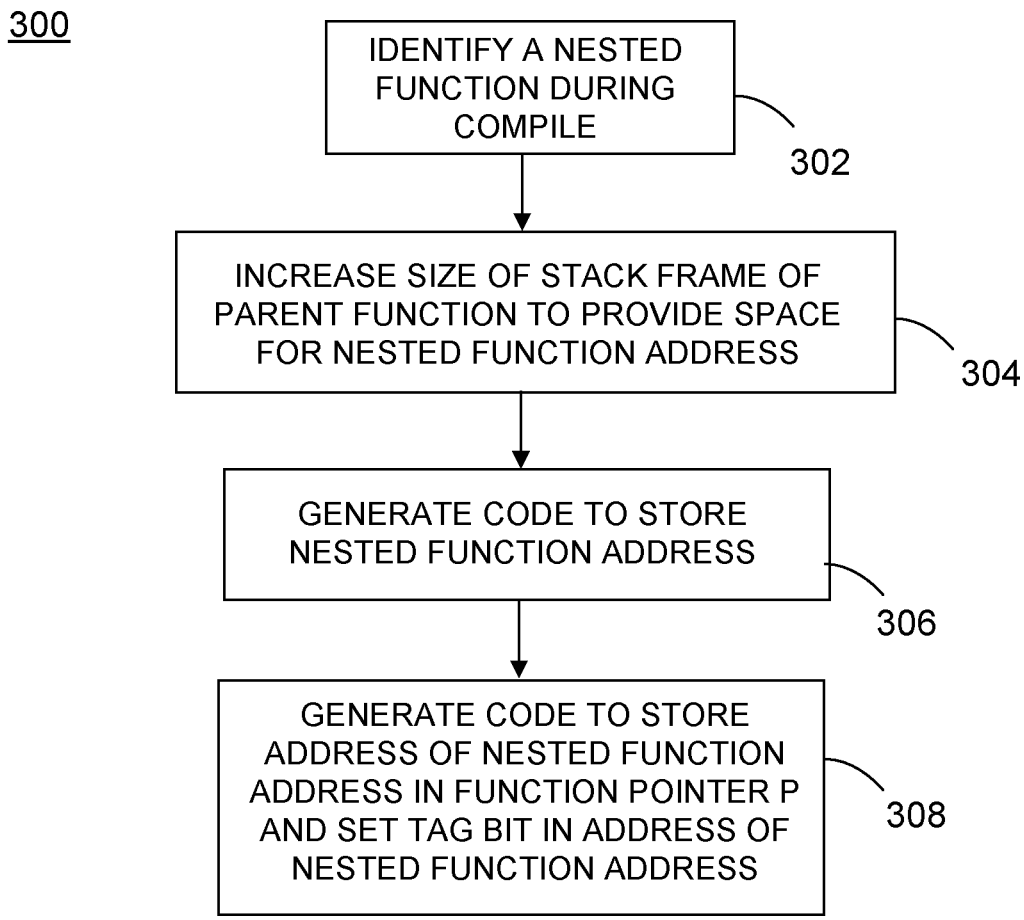
FIG. 3 illustrates a method for configuring a stack frame for use in calling a nested function according to various embodiments.

FIG. 3 illustrates a method 300 for configuring a stack frame for use in calling a nested called function according to various embodiments. All or part of the method 300 may be performed by a compiler at compile time, by a linker at link time, by compiled code at run time, or by any other suitable component at an appropriate time. At operation 302, a nested function, e.g., function A1, is identified in a portion of code being compiled. At runtime, the nested function may be stored at a particular address in memory, e.g., address Y. In addition, a parent function of the nested function may be identified, e.g., function A. An area of memory, e.g., a stack frame, is allocated when a function is called. The stack frame may store environment information for the function. At 304, the memory size to be allocated for the stack frame of the parent function of the nested function may be increased. The stack frame size may be increased to provide a space for an address of the nested function, e.g., memory location 210 (nested function address, P2). At 306, code is generated to store the address of the nested function, e.g., address Y, at a memory location in the stack frame, e.g. nested function address 210. This memory location itself has an address, e.g., 100010, which is used in operation 308. At 308, code is generated to store the address of the nested function address location in a function pointer, e.g., first pointer P1. An address is stored in a function pointer by storing the address at a memory location in the stack frame, e.g. address 208 in FIG. 2. The address of the nested function address location may be an address within the stack frame. In addition, the operation 308 may include modifying the address stored in the function pointer P1. Specifically, a tag bit in this address may be set. The tag bit may be any suitable bit, such as the least-significant bit (LSB) or a most-significant bit (MSB) of the address. The best choice for which bit depends on the CPU architecture and the operating system.

Figure 4:
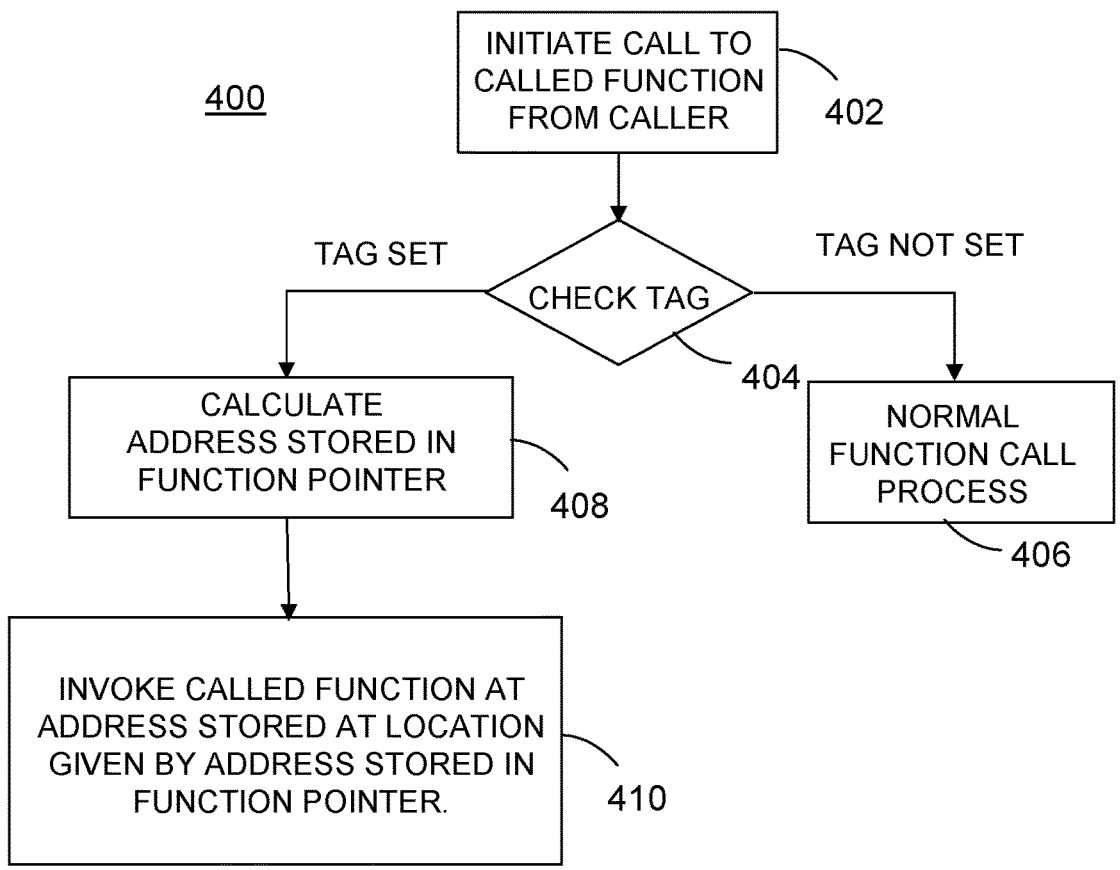
FIG. 4 is a flow chart of an example of a process for an indirect call to a nested function by a caller function according to various embodiments.

FIG. 4 is a flow chart of an example of a process 400 for making an indirect call to a nested function by a caller function according to various embodiments. The method 400 may be performed by a parent function, e.g., function A, at runtime in various embodiments. At operation 402, the call may be initiated when a call statement, e.g., the call statement 203, is encountered in the parent function. The operation 402 may include executing a call statement, which for an indirect or pointer call will include an operation to dereference a pointer. In other words, the operation 402 may include obtaining the address stored for a pointer, e.g., first pointer P1, in the stack frame. In the example of FIG. 2, memory address 100011 stored at memory location 208 in stack frame 204 may be obtained.

At operation 402, the address obtained from function pointer storage location 208 is inspected. Specifically, according to various embodiments, one or more bits of the address reserved for a tag are checked. If a tag bit is not set, e.g., it is a zero, the call code sequence continues with a normal or conventional pointer call (operation 406). If the tag bit is set, e.g., it is a one, the call code sequence continues with a nested function pointer call (operation 408).

In operation 408, the memory address where the address of the nested function is stored is calculated or determined. In the example of FIG. 2, the address obtained from function pointer storage location 208 is 100011. In one example, the operation 408 may determine address where the address of the nested function is stored by subtracting the tag bit value of 1 from 100011 to obtain the address 100010. In various embodiments, the operation 408 may cancel a tag bit value from the address stored for a first function pointer P1 by adding or subtracting a value from the first pointer P1 address. For example, the calculation may be performed using an "add immediate" or "subtract immediate" instruction. In some embodiments, operation 408 may include two or more instructions. The operation 408 effectively cancels the tag bit to determine the memory address where the address of the nested function is stored, i.e., the nested function address 210. It will be appreciated that the use of a single instruction to cancel a tag bit results in very low computational cost. Even in an architecture where cancelling the tag bit requires multiple instructions, the computational cost is still low.

Operation 410 includes reading the address of the nested function from the nested function address 210 determined in operation 408. In the example of FIG. 2, operation 410 includes reading the address of the nested function, i.e., address Y, from nested function address at location 100010. In addition, in operation 410, control may be transferred to the nested function 206, such as by causing a processor to execute an instruction stored at address Y, e.g., an entry point for function A1. The operation 410 may include passing an address for identifying an environment variable of the calling function's stack frame, e.g., stack frame 204, to the called function. In various embodiments, the address stored in the function pointer may be passed to the called function. The address stored in the function pointer may be passed to the called function either in a form that includes a tag bit or after an operation to cancel the tag bit. Using the example of FIG. 2, either of addresses 100011 or 100010 may be passed to the called function. If the passed address includes a tag bit, the function A1 includes one or more instructions, e.g., an initialization instruction, to cancel the tag bit. In various embodiments, a known distance or known offset from the address 210 (the nested function address) to the top or bottom of the stack frame (or other environment variable location) may also be passed to the called function. However, in various embodiments, it is not necessary to pass an offset because when the nested function was compiled, its parent function's stack frame layout was already determined, so the offset was already known.

Figure 5:
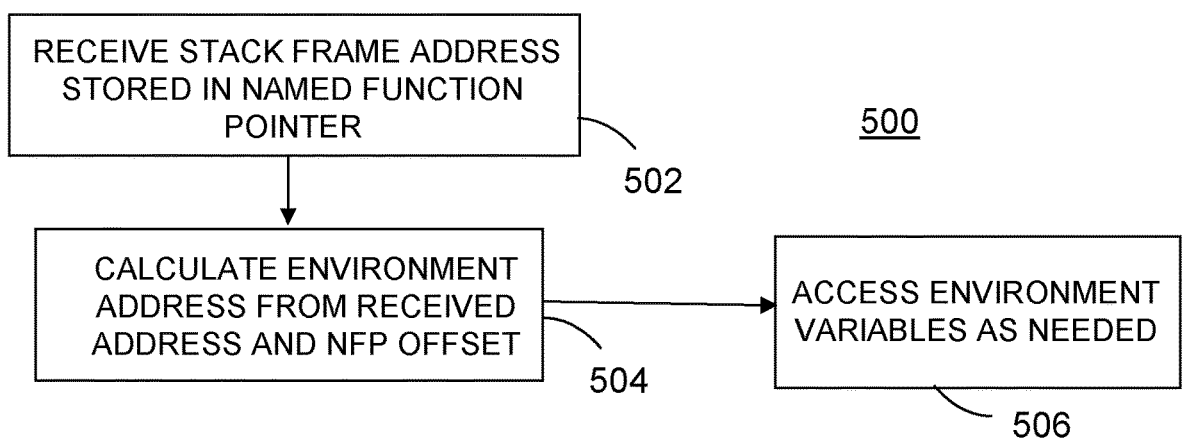
FIG. 5 is a flow chart of an example of a process performed by a nested function when it is called according to various embodiments.

FIG. 5 is a flow chart of an example of a process 500 that may be performed by a nested function, e.g., function A1, when it is called according to various embodiments. In operation 502, an address of the calling function's stack frame is received. The received nested function address 210 may be the address stored in a function pointer used by the calling function in an indirect call (pointer P1), e.g. the address stored in memory location 208. The received address may include a tag bit or be in a form in which the tag bit has been cancelled. In an embodiment, the received address may be an address of an environment variable location, i.e., an address resulting from an addition or subtraction of a known offset from the nested function address 210.

In operation 504, an environment address may be determined, such as by initialization instructions of the nested function. In various embodiments, the environment address may be calculated by adding or subtracting a known offset distance from the received address, e.g., the nested function address. In an embodiment, initialization instructions of the nested function may complete a calculation of an environment address from a partial value (nested function address) passed to it. The initialization instructions may either add or subtract a known difference between a required environment offset in the parent function's stack frame and an offset of the nested function address. For example, the environment address may point at the bottom of the parent's stack frame. In this case, the offset of the address stored in first pointer P1 from the bottom (plus 1 to cancel the tag bit) must be subtracted from the partially calculated environment address. In another example, the environment address may point at the top of the parent's stack frame. In this case, the offset of the address stored in first pointer P1 from the top (minus 1 to cancel the tag bit) must be added to the partially calculated environment address. Whether the initialization instructions may perform an add or subtract operation depends on aspects of the system implementation, such as: the direction the stack grows, the machine architecture, and whether the parent function ever grows its stack frame while executing.

In operation 506, any needed environment variable values stored in the calling function's stack frame may be accessed using the calculated address.

As described above, in various embodiments, the function pointer P is a tagged pointer. A "tagged pointer" is one in which most of the bits contain an address, but one or more of the bits contain a tag describing one or more attributes of the address. As mentioned, a function pointer holds a memory address of a function. According to various embodiments, one or more bits of the memory address of a function stored in a function pointer may be used to identify whether the function at the address is a nested function. In various embodiments, one or more of the LSBs or MSBs of an address may be used.

On many computer architectures, an instruction address must be a multiple of two or a higher value. On IBM z/Architecture, instruction addresses must be a multiple of two. On IBM PowerPC, Oracle/Sun SPARC, MIPS and many other architectures, the instruction address must be a multiple of four. On Intel IA-64, the instruction address must be a multiple of sixteen. In all these cases, the lower bit or one of the lower bits can be used as a tag without reducing the available address range. On Intel IA-32 (x86) and some other architectures, instructions can be at any address, so the lowest bit is inappropriate, but the principles of the invention may be employed using the upper bit of an address as a tag at the cost of reduced address range.

As one example, consider the address format that may be used in the IBM PowerPC architecture. In this example, either of the lower two address bits could be used as a tag. For purposes of a simplified example, assume the lowest bit is used as the tag and a tag bit value of zero signifies that the pointer contains the address of a nested function. In an embodiment, a tag bit value of zero may signify that the pointer contains the address of a trampoline. A value of zero may be preferred to a value of one because it is compatible with some existing non-nested function code where the lower two bits must be zeros. According to various embodiments, if the tag bit is a one, then the pointer contains the information needed to determine both the function code address and the environment address.

Advantageously, embodiments of the invention work for both nested and non-nested functions. Embodiments of the invention also work for "trampolines," which is useful when interfacing to code compiled using a trampoline technique. One advantage of various embodiments of the present invention is that the pointer call speed for non-nested functions is essentially the same as the call speed for a default pointer call sequence. Another advantage is that the call speed for a pointer call to a nested function is almost as fast as for a non-nested function. An additional advantage is that setting a pointer to the address of a nested function is at least as fast as, and typically faster than, setting a pointer for a non-nested function. Moreover, various embodiments advantageously do not require an executable stack and thereby avoid the complications and security problems that are introduced with the use of an executable stack.

It is beneficial if the nested function, e.g., function A1, is able to be called directly (not via a pointer) by its parent, a sibling, a child or other descendent. Direct calls may be performed in either of two ways.

In one embodiment for a direct call, instead of passing an environment address to the nested function when it is called, the caller passes the address of a pointer for any nested function whose address is stored in a function pointer. The address of the pointer passed to the nested function may include a tag bit or be in a form in which the tag bit has been cancelled. The called function will adjust the address of the pointer in the same way as done in a pointer call. In some situations, a nested function may only be called directly, and may never be called indirectly via a pointer call. In this case, the caller passes the stack pointer or frame pointer and no adjustment by the called function is needed.

In another embodiment, the actual environment address may be passed to the nested function and the adjustment or initialization instruction(s) in the nested function are bypassed. In this embodiment, the nested function is provided with dual entry points. The first entry point is used for indirect or pointer calls. After entering at the first entry point, one or more adjustment instructions are executed to calculate the environment area address and set the environment area register, and then the code either branches to or falls through into the second entry point. The second entry point contains the function's main code and is used for direct calls, where the caller is responsible for setting up the environment area register.

In an embodiment, a tag bit can be used to distinguish between a function pointer containing a function code address and one containing the address of a function descriptor. In one embodiment of that, the function descriptor would contain the function address and the environment address (initialized at the time the function pointer is), allowing the environment address to always be passed by the caller and avoiding the need for a separate nested pointer call entry point.

The various embodiments disclosed herein are well suited for use with the IBM OpenPOWER Little Endian Linux operating system, which allows separate local and global or pointer entry points for each function. Any additional instruction(s) used to calculate the environment pointer would only be executed for local pointer calls (nested functions cannot be global so cannot be called by global calls). In embodiments where the principles disclosed herein are used with other operating systems or environments, a caller may load a pair of pointers (instruction address and environment address) from where the tagged function pointer points.

FIG. 6 illustrates one example of assembler-like and C source code for a call to a nested function suitable for use with an IBM Power computer system. Each line contains an assembler-like instruction using the POWER Architecture instruction name instead of the assembler mnemonic (e.g., "Add Immediate" instead of "addi"), and long names instead of assembler abbreviations for register names (e.g., "condition_register_1" instead of "cr1" or just "1"), followed by "//" then the C equivalent of that assembler instruction.

FIG. 7 illustrates one example of assembler-like and C source code for the function initialization instructions for the Nested Indirect Call Entry Point for a nested function. FIG. 7 is formatted the same way as FIG. 6.

FIGS. 8A-H illustrate various principles of the invention with an example in which multiple instances of a parent and another function have frames on a stack. If recursion or other situations lead to multiple instances of a parent function (and perhaps multiple instances of a nested or other function) on the stack, embodiments of the invention provide a called function with access to the environment information of the parent that created the function pointer used to call the nested function. The example of FIGS. 8A-H shows how instances of functions are able to access the environment variables of the parent function that created the function pointer that was used to call the nested function.

FIGS. 8A and 8B are similar to FIG. 2. FIGS. 8A and 8B show a nested function A1 816, its parent function A 812, and a stack 814. Unlike FIG. 2, FIGS. 8A and 8B additionally show another function 818, denoted B. The parent function A includes an assignment statement, "P=A1," and a call statement to function B, "call B(P)." The call statement "call B(P)" passes Pointer P as a parameter to function B. The parent function A includes a call statement "call P," which is an indirect call to nested function A1, and the function B includes a call statement, "call A."

The stack shown in FIGS. 8A and 8B includes a frame 802 of the parent function A. Although not shown in the figures, the stack frame 802 stores environment information for a first instance of function A. The frame 802 for function A has a stack pointer, designated as "Outer A's Stack Pointer."

FIG. 8A depicts an initial state of program execution. The state shown in FIG. 8A may be a state prior to the assignment statement, "P=A1," being reached. Memory on the stack has been allocated on the stack for a stack frame 802 for function A. The memory size allocated for the stack frame 802 of the parent function has been increased to provide a space for a nested function address location, i.e., the location at nested function address A1A. In addition, the stack frame 802 includes a memory location to store an address for Pointer P. In FIG. 8A, the address "r" of the nested function is stored at the nested function address location A1A in the stack frame. In addition, in FIG. 8A, an address "s" has been stored in Pointer P in the stack frame.

FIG. 8B depicts a state after "P=A1" has been executed. The arrow 820 from nested function address location A1A to nested function A1 signifies that the address stored in nested function address A1A points to the nested function A1. The arrow from Pointer P to nested function address A1A signifies that the address "s" points to the nested function address location A1A. Further, the address stored in Pointer P has been modified by setting a tag bit, shown by a "1." The tag bit indicates that the stored address points to an address of a nested function.

FIG. 8C depicts a state after call B(P) has been executed, but before call A has been executed. When B(P) is called, a frame 804 is allocated on the stack for function B and Pointer P is passed to function B. The frame 804 for function B has a stack pointer, designated as "Outer B's Stack Pointer." The frame 804 for function B includes "t," which is an address stored in Pointer P. The arrow from Pointer P in frame 804 to nested function address location A1A in frame 802 signifies that the address "t" points to the nested function address location A1A. The address stored in Pointer P in frame 804 includes a tag bit, shown by a "1." Because function B has an address in its stack frame 804 that points to the nested function address location A1A in frame 802, the function B is able to use this address to determine the address at which the environment variables for function A are stored in frame 802. In this example, the nested function address is a known distance from the top of stack frame 802.

Figure 8D:
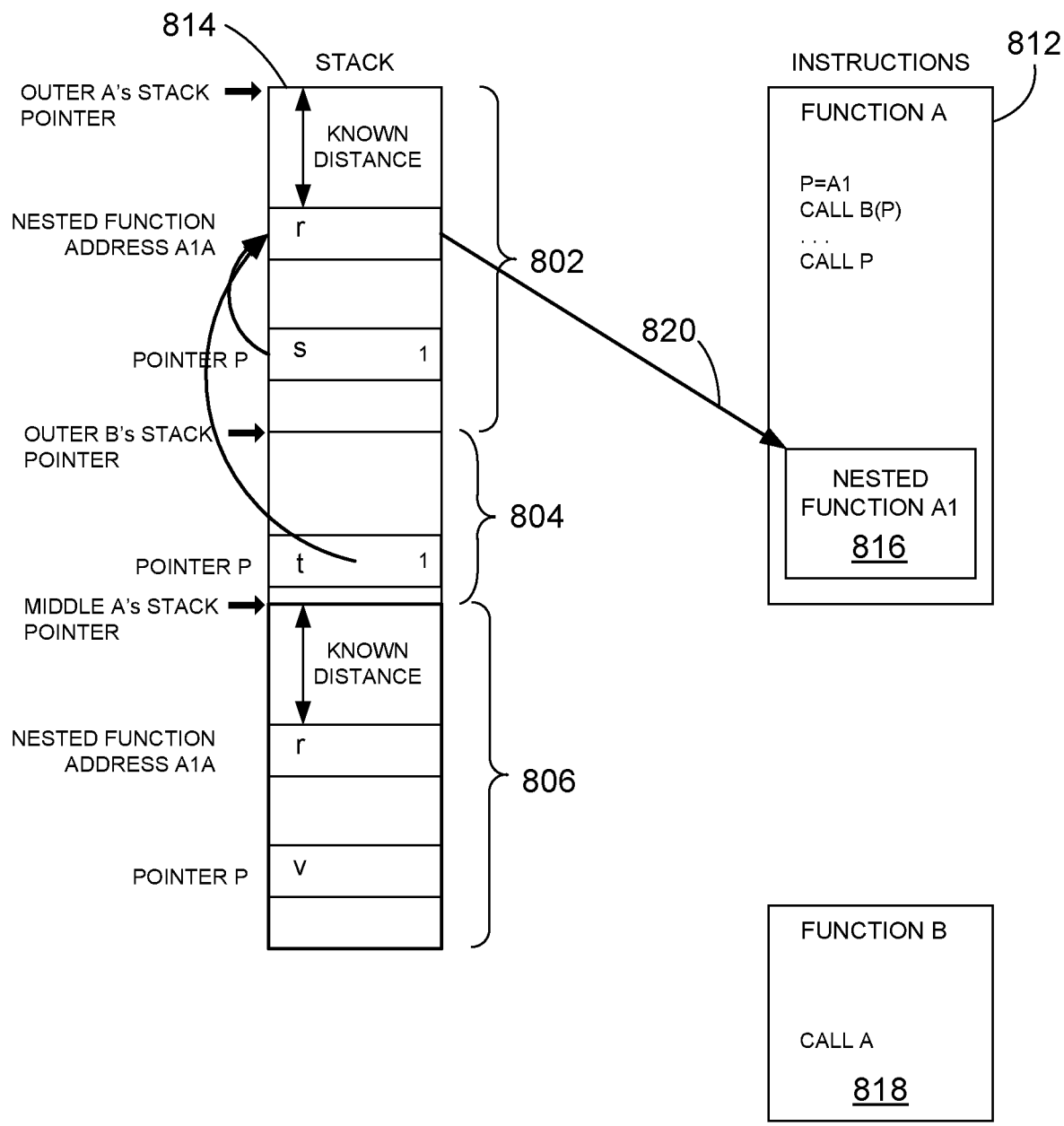

FIG. 8D depicts a state after the call A in function B has been executed, but before P=A1 is reached in a second instance of function A. When A is called by B, a frame 806 is allocated on the stack for the second instance of function A. The frame 806 for the second instance of function A has a stack pointer, designated as "Middle A's Stack Pointer." The memory size allocated for the stack frame 806 has been increased to provide a space for an address of the nested function, i.e., nested function address location A1A. Although not shown in the figures, the stack frame 806 stores environment information for the second instance of function A. In FIG. 8D, the address "r" of the nested function A1 is stored in the nested function address location A1A in the stack frame 806. In addition, in FIG. 8D, an address "v" has been stored in the Pointer P in the stack frame 806.

Figure 8E:
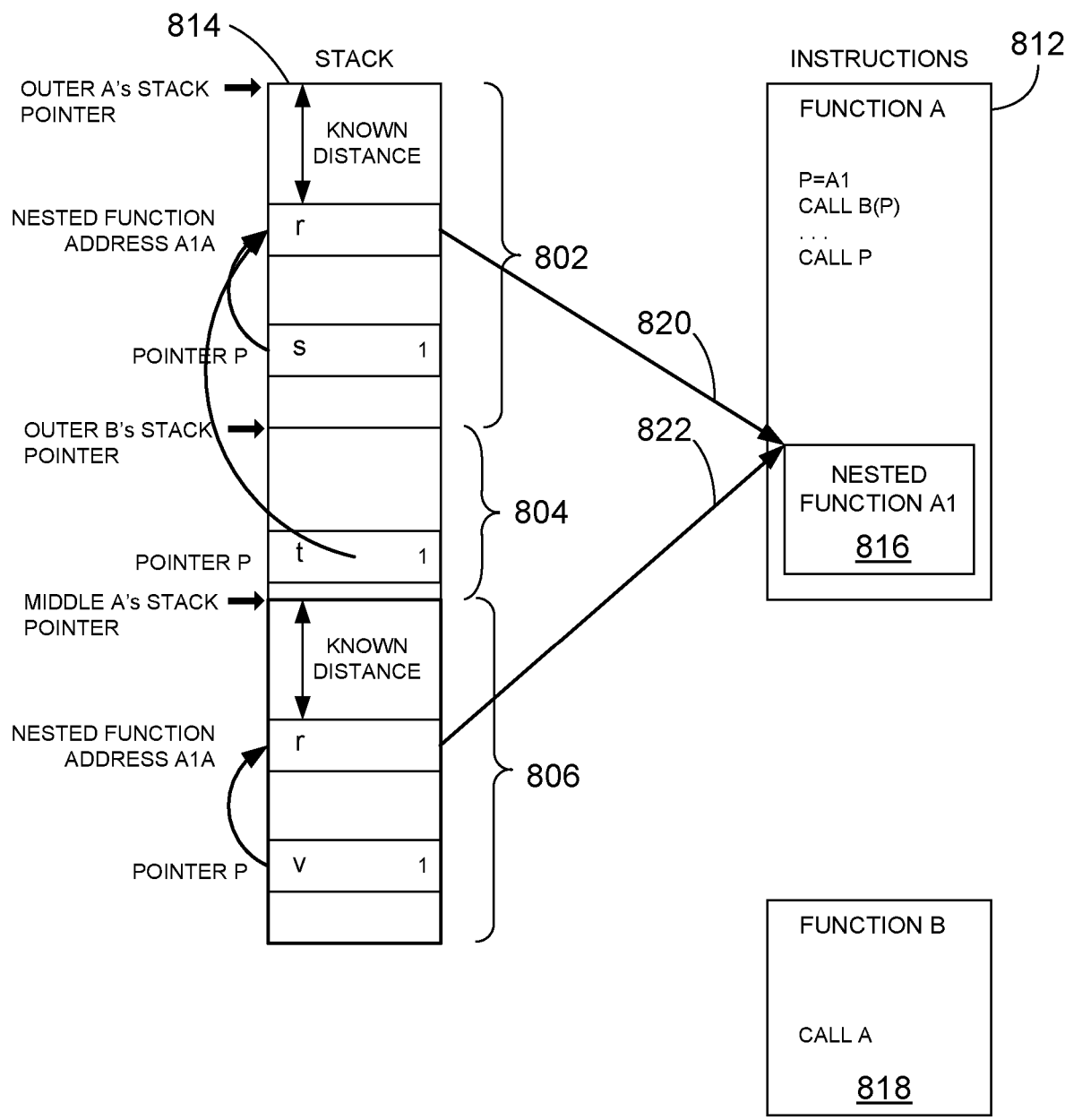

FIG. 8E depicts a state after function A has been called and after the second instance of function A executes P=A1. The arrow 822 from nested function address location A1A in the stack frame 806 to nested function A1 signifies that the address "r" in nested function address location A1A points to the nested function A1. The arrow from Pointer P in the stack frame 806 to nested function address location A1A in the stack frame 806 signifies that the address "v" points to nested function address A1A. Further, the address stored in Pointer P has been modified by setting a tag bit, shown by a "1."

Figure 8F:
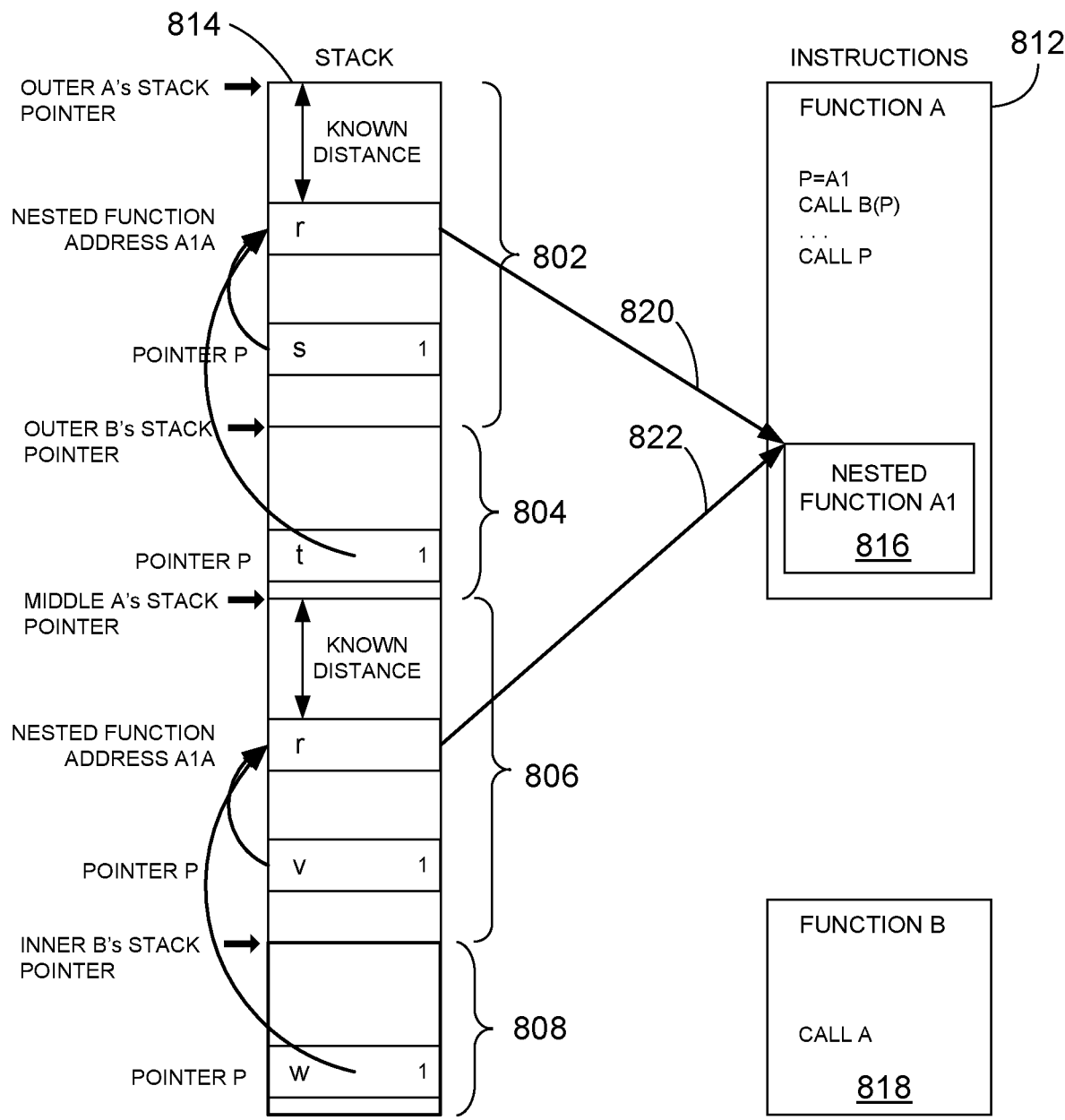

FIG. 8F depicts a state after the call B(P) in the second instance of function A has been executed, but before the call A in a second instance of function B has been executed. When B(P) is called the second time, a frame 808 is allocated on the stack for the second instance of function B. In addition, the Pointer P is passed to the second instance of function B. The frame 808 for the second instance of function B has a stack pointer, designated as "Inner B's Stack Pointer." The frame 808 for the second instance of function B includes a location in which an address "w" has been stored in Pointer P. The arrow from Pointer P in frame 808 to nested function address A1A in frame 806 signifies that the address "w" points to the nested function address A1A. The address stored in Pointer P in frame 808 includes a tag bit, shown by a "1." Because the second instance of function B has an address in its stack frame 808 that points to the nested function address A1A in frame 806, the function B is able to use this address to determine the address at which the environment variables for the second instance of function A are stored in frame 806. In this example, the nested function address A1A in frame 806 is a known distance from the top of stack frame 802.

Figure 8G:
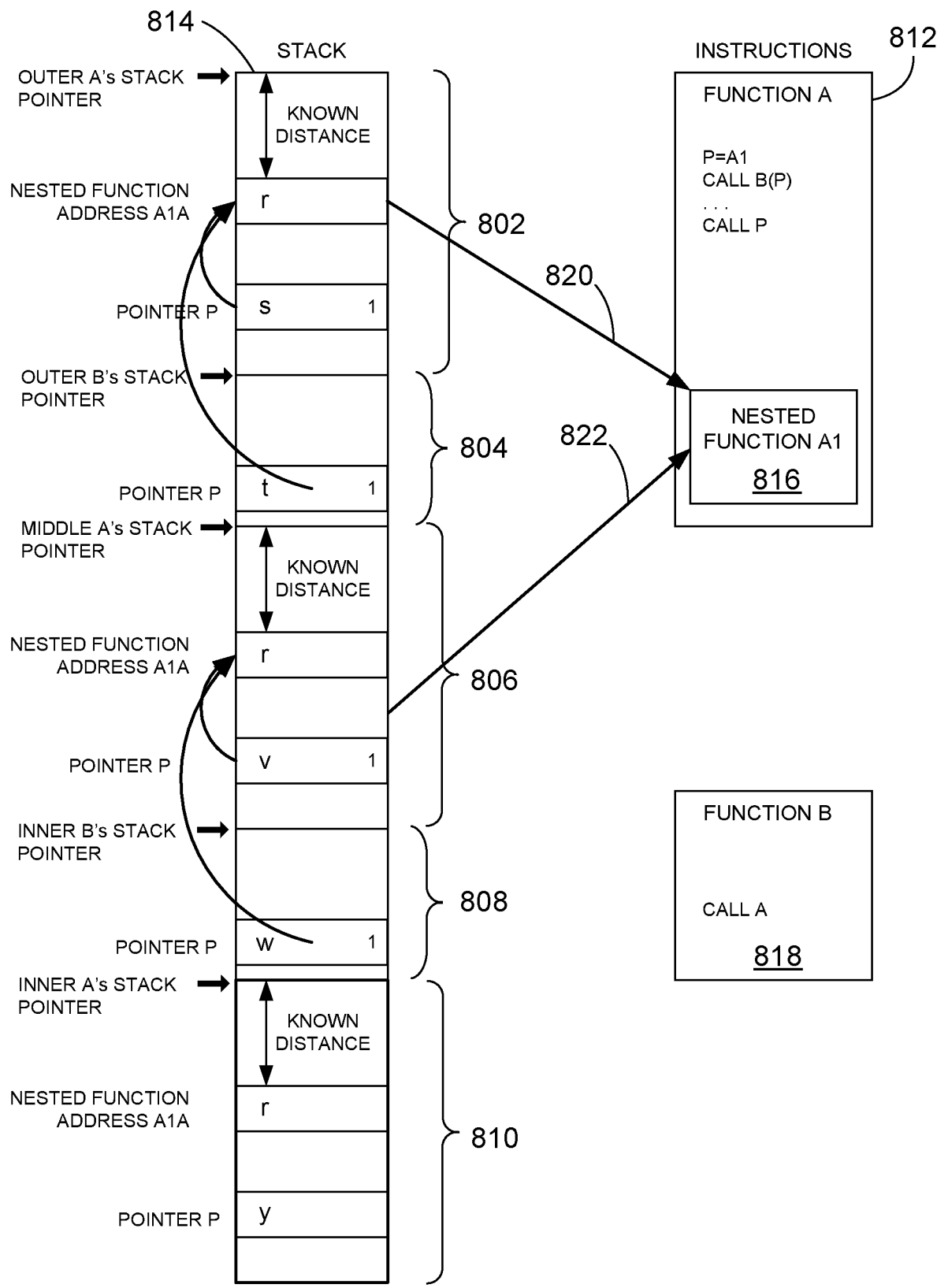

FIG. 8G depicts a state after the call A in the second instance of function B has been executed, but before P=A1 in the third instance of function A has been executed. When A is called by B, a frame 810 is allocated on the stack for the third instance of function A. The frame 810 for the third instance of function A has a stack pointer, designated as "Inner A's Stack Pointer." The memory size allocated for the stack frame 810 of the third instance of function A has been increased to provide a space for an address of the nested function, i.e., nested function address A1A. Although not shown in the figures, the stack frame 810 stores environment information for the third instance of function A. In FIG. 8G, the address "r" of the nested function A1 is stored in the nested function address A1A. In addition, in FIG. 8G, an address "y" has been stored in the Pointer P in the stack frame 810.

Figure 8H:
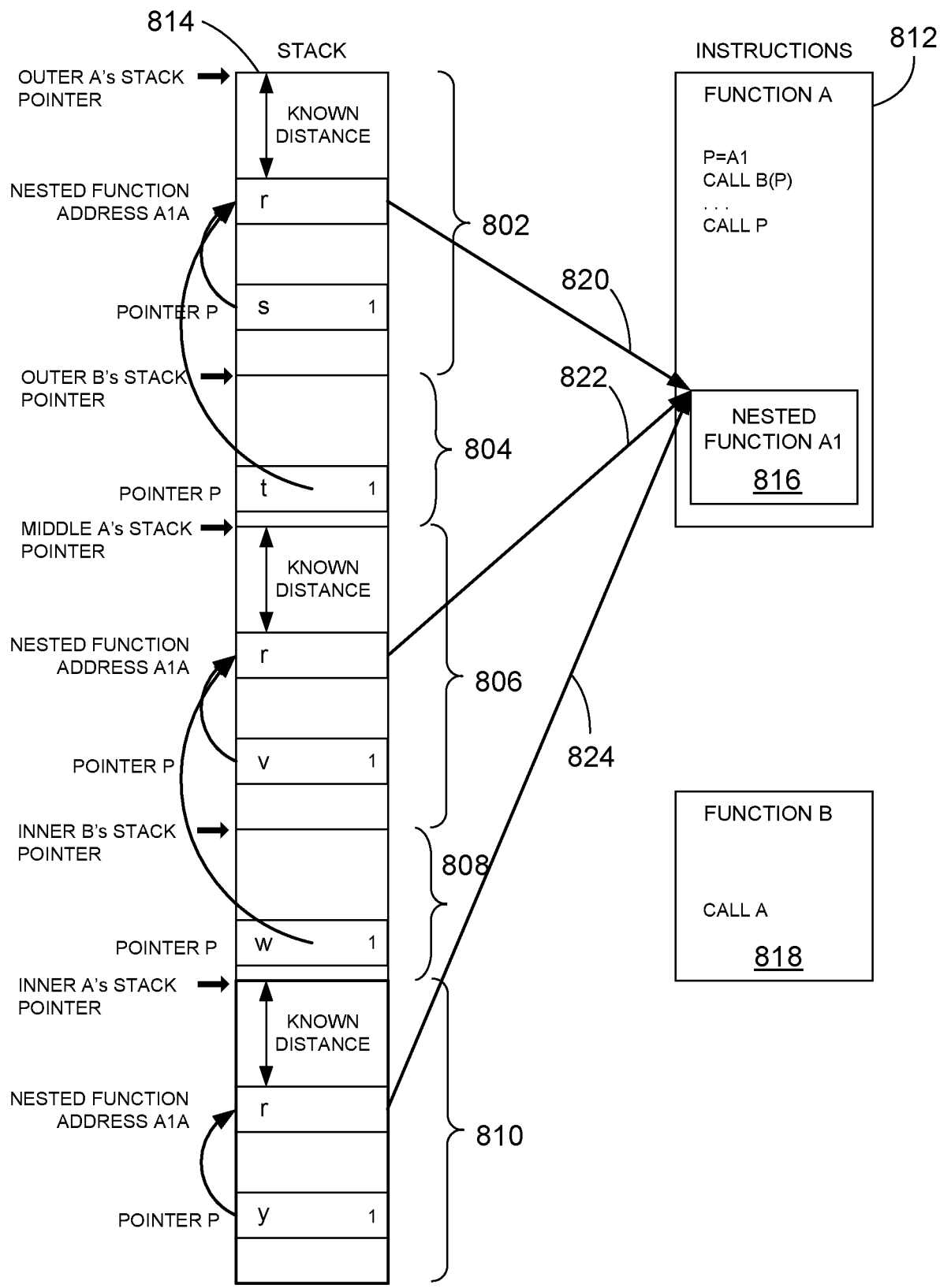

FIG. 8H depicts a state after A has been called and after the third instance of A executes P=A1. The arrow 824 from nested function address A1A in the stack frame 810 to nested function A1 signifies that the address "r" stored at in the nested function address A1A points to the nested function A1. The arrow from Pointer P in the stack frame 810 to nested function address A1A in the stack frame 810 signifies that the address "y" points to nested function address A1A. Further, the address stored in Pointer P has been modified by setting a tag bit, shown by a "1."

Figure 9:
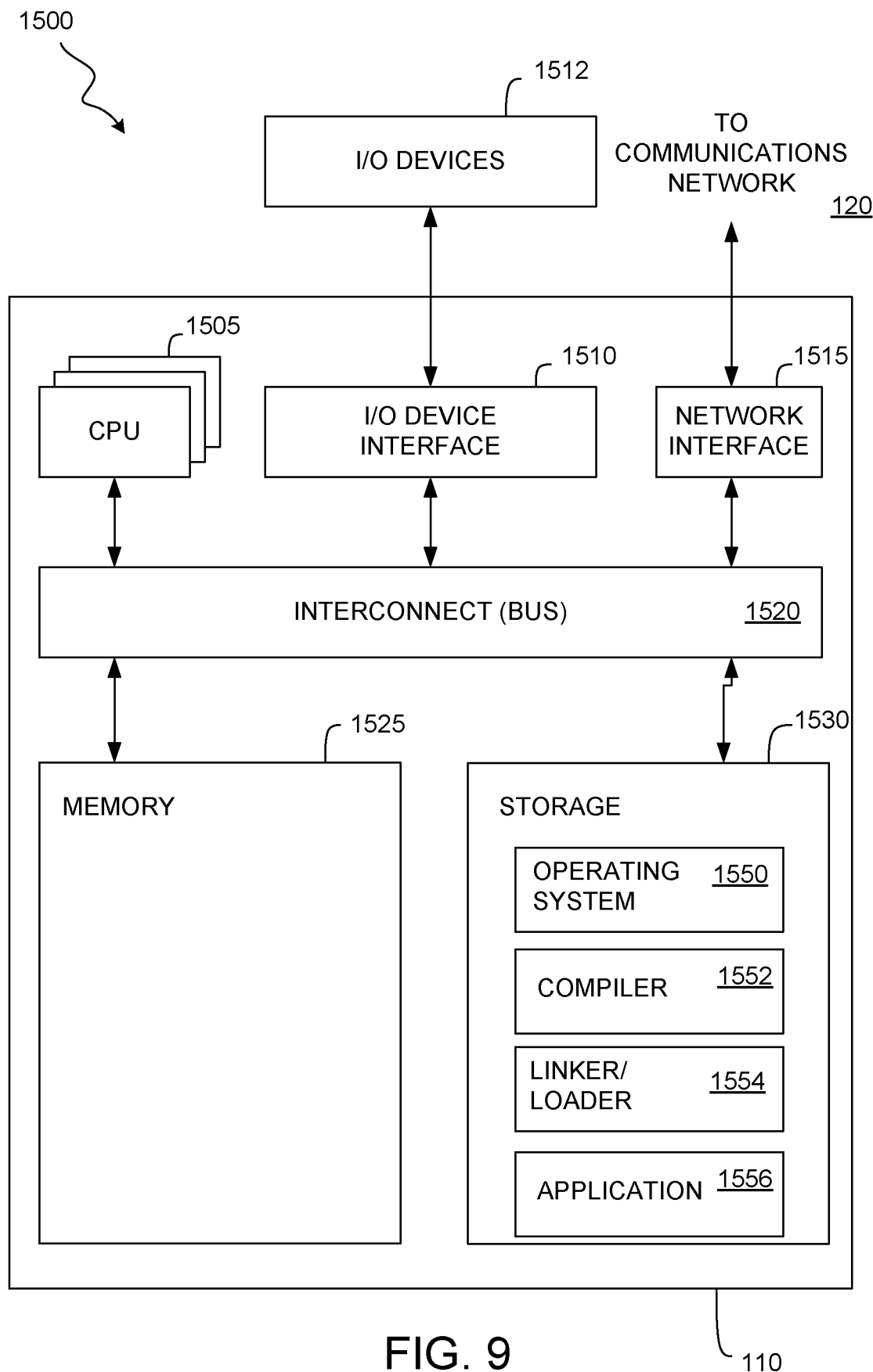
FIG. 9 is a schematic drawing of an exemplary computer system.

FIG. 9 is one example of a computer system in which various embodiments may be implemented. The computer system 110 may include, without limitation, one or more processors (CPUs) 1505, a network interface 1515, an interconnect 1520, a memory 1525, and a storage 1530. The computer system 110 may also include an I/O device interface 1510 used to connect I/O devices 1512, e.g., keyboard, display, and mouse devices, to the computer system 110.

Each CPU 1505 retrieves and executes programming instructions stored in the memory 1525 or storage 1530. Similarly, the CPU 1505 stores and retrieves application data residing in the memory 1525. The interconnect 1520 is used to transmit programming instructions and application data between each CPU 1505, I/O device interface 1510, storage 1530, network interface 1515, and memory 1525. The interconnect 1520 may be one or more busses. The CPUs 1505 may be a single CPU, multiple CPUs, or a single CPU having multiple processing cores in various embodiments. In an embodiment, a processor 1505 may be a digital signal processor (DSP).

The memory 1525 is generally included to be representative of a random access memory, e.g., Static Random Access Memory (SRAM), Dynamic Random Access Memory (DRAM), or Flash. The memory 1525 may store a program and a run-time stack for use in the embodiments described herein. The storage 1530 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 1515 is configured to transmit data via the communications network 120.

The computer system 110 may include one or more operating systems 1550, compilers 1552, linkers or loaders (or both) 1554, and software programs 1556 (in source or compiled form, or in both forms). An operating system 1550, a compiler 1552, a linker/loader 1554, or a software program 1556 may be stored partially in memory 1525 and partially in storage 1530. Alternatively, these components may be stored entirely in memory 1525 or entirely in storage 1530. The operating system provides an interface between various hardware resources, including the CPU 1505, as well as known components generally provided and omitted so as to not unnecessarily obscure embodiments of the invention. In addition, an operating system provides common services for application programs, such as providing a time function.

Aspects of the present disclosure may be a system, a method, and/or a computer program product. The computer program product may include a computer readable storage medium (or media) having computer readable program instructions thereon for causing a processor to carry out aspects of the various embodiments. The computer readable program instructions can be stored and executed on a single computer or divided amongst different computers, at the same location or different locations, for storage and execution.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for calling a function, comprising:
   determining whether a call is a direct or an indirect call;
   in response to determining that the call is an indirect call,
      obtaining a first address stored in a function pointer, wherein the function pointer is stored at a first address in a stack frame of a calling function;
   determining whether to execute a nested function call code sequence based on whether a tag bit in the first address stored in the function pointer is set; and
   in response to determining that the tag bit in the first address is set:
      obtaining a second address stored at a nested function address location, wherein the nested function address location is at the first address, and
      transferring control to a called function, wherein the called function is stored at the second address.

2. The method of claim 1, wherein the obtaining a second address stored at a nested function address location, further comprises:
   cancelling the tag bit in the first address stored in the function pointer.

3. The method of claim 1, further comprising accessing, by the called function, an environment variable of the calling function.

4. The method of claim 1, further comprising accessing, by the called function, an environment variable of a first calling function, wherein:
   the called function is called by a second calling function, the second calling function being a calling function other than the first calling function.

5. The method of claim 1, wherein in response to determining that the tag bit in the first address stored in the function pointer is not set, the method further comprises:
   transferring control to a called function, wherein the called function is stored at the first address.

6. The method of claim 1, wherein in response to determining that the call is a direct call, the method further comprises:
   passing to a called function: the address of a pointer for a nested function having an address is stored in a function pointer, wherein the nested function is nested in the calling function.

7. The method of claim 6, wherein the address stored in the function pointer either includes a tag bit or does not include a tag bit.

8. The method of claim 1, wherein in response to determining that the call is a direct call, further comprising:
   passing to a called function: the address of an environmental variable of a calling function.

9. The method of claim 8, wherein the called function includes an entry point for direct calls and an entry point for indirect calls.

10. A computer system comprising:
    a processor; and
    a memory communicatively coupled with the processor, wherein the memory is encoded within instructions that when executed by the processor perform operations for calling a function comprising:
    determining whether a call is a direct or an indirect call;
    in response to determining that the call is an indirect call,
       obtaining a first address stored in a function pointer, wherein the function pointer is stored at a first address in a stack frame of a calling function;
    determining whether to execute a nested function call code sequence based on whether a tag bit in the first address stored in the function pointer is set; and
    in response to determining that the tag bit in the first address is set:
       obtaining a second address stored at a nested function address location, wherein the nested function address location is at the first address, and
       transferring control to a called function, wherein the called function is stored at the second address.

11. The computer system of claim 10, wherein the obtaining a second address stored at a nested function address location, further comprises:
    cancelling the tag bit in the first address stored in the function pointer.

12. The computer system of claim 10, further comprising accessing, by the called function, an environment variable of the calling function.

13. The computer system of claim 10, further comprising accessing, by the called function, an environment variable of a first calling function, wherein:
    the called function is called by a second calling function, the second calling function being a calling function other than the first calling function.

14. The computer system of claim 10, wherein in response to determining that the tag bit in the first address stored in the function pointer is not set, the operations further comprise:
    transferring control to a called function, wherein the called function is stored at the first address.

15. The computer system of claim 10, wherein in response to determining that the call is a direct call, the operations further comprise:
    passing to a called function: the address of a pointer for a nested function having an address is stored in a function pointer, wherein the nested function is nested in the calling function.

16. A computer program product for calling a function, the computer program product comprising:
    one or more computer readable storage media, and program instructions collectively stored on the one or more computer readable storage media, the program instructions comprising:
    program instructions to determine whether a call is a direct or an indirect call;
    program instructions, responsive to determining that the call is an indirect call, to obtain a first address stored in a function pointer, wherein the function pointer is stored at a first address in a stack frame of a calling function;
    program instructions to determine whether to execute a nested function call code sequence based on whether a tag bit in the first address stored in the function pointer is set; and
    program instructions, responsive to determining that the tag bit in the first address is set, to:
       obtain a second address stored at a nested function address location, wherein the nested function address location is at the first address, and transfer control to a called function, wherein the called function is stored at the second address.

17. The computer program product of claim 16, wherein the program instructions to obtain a second address stored at a nested function address location, further comprise instructions to:
   cancel the tag bit in the first address stored in the function pointer.

18. The computer program product of claim 16, further comprising program instructions to access, by the called function, an environment variable of the calling function.

19. The computer program product of claim 16, further comprising program instructions to access, by the called function, an environment variable of a first calling function, wherein:
   the called function is called by a second calling function, the second calling function being a calling function other than the first calling function.

20. The computer program product of claim 16, wherein in response to determining that the tag bit in the first address stored in the function pointer is not set, the program instructions further comprise instructions to:
   transfer control to a called function, wherein the called function is stored at the first address.

* * * * *